US009599970B2

(12) United States Patent
Reed et al.

(10) Patent No.: US 9,599,970 B2
(45) Date of Patent: Mar. 21, 2017

(54) SAFETY CRITICAL CONTROL SYSTEM THAT INCLUDES CONTROL LOGIC OR MACHINE READABLE INSTRUCTIONS THAT SELECTIVELY LOCKS OR ENABLES THE CONTROL SYSTEM BASED ON ONE OR MORE MACHINE IMPLEMENTED STATE MACHINES THAT INCLUDES STATES ASSOCIATED WITH DETECTION OR MATCHING OF ONE OR MORE PREDETERMINED SIGNALS ON DISTINCT CONDUCTION PATHS BETWEEN ELEMENTS OF THE CONTROL SYSTEM AND RELATED METHODS

(71) Applicant: United States of America as represented by the Secretary of the Navy, Washington, DC (US)

(72) Inventors: William Reed, Indianapolis, IN (US); Dan Duval, Greenwood, IN (US); John Proctor, Fishers, IN (US); Alan Ford, Westfield, IN (US); Chris Williams, Indianapolis, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 331 days.

(21) Appl. No.: 14/195,241

(22) Filed: Mar. 3, 2014

(65) Prior Publication Data

US 2014/0316537 A1    Oct. 23, 2014

Related U.S. Application Data

(60) Provisional application No. 61/805,551, filed on Mar. 27, 2013.

(51) Int. Cl.
*G05B 9/02*      (2006.01)
*C08L 75/04*    (2006.01)
(Continued)

(52) U.S. Cl.
CPC ................ *G05B 9/02* (2013.01); *B29C 39/24* (2013.01); *B29C 44/02* (2013.01); *C04B 26/16* (2013.01);
(Continued)

(58) Field of Classification Search
None
See application file for complete search history.

(56) References Cited

U.S. PATENT DOCUMENTS 5,880,954 A * 3/1999 Thomson .................. F16P 3/14
                                                                250/221
6,201,997 B1 * 3/2001 Giers ...................... B60T 8/885
                                                                700/111
(Continued)

OTHER PUBLICATIONS

Ye "Justifying the Use of COTS Components within Safety Critical Applications," Ph.D thesis, University of York, York, England, 2005.*

(Continued)

*Primary Examiner* — Van Nguyen
(74) *Attorney, Agent, or Firm* — Christopher A. Monsey

(57) ABSTRACT

This disclosure involves a method of controlling a safety critical control device, the method comprising: sending user inputs to a first state machine, identifying user inputs by the first state machine, determining the correct state to communicate to a second state machine, the correct state being determined by selecting one state of a plurality of states depending on the user inputs, communicating the correct state to a second state machine through a control bus, and
(Continued)

determining the correct state for the second state machine based on communication from the control bus.

12 Claims, 6 Drawing Sheets

(51) Int. Cl.
*B29C 39/24* (2006.01)
*C04B 26/16* (2006.01)
*B29C 44/02* (2006.01)
*C08G 18/76* (2006.01)
*C08G 18/36* (2006.01)
*C04B 111/40* (2006.01)
*B29K 309/06* (2006.01)
*B29K 75/00* (2006.01)
*B29K 105/12* (2006.01)
*B29L 31/10* (2006.01)
*C08K 3/36* (2006.01)
*C08G 101/00* (2006.01)

(52) U.S. Cl.
CPC ......... *C08G 18/36* (2013.01); *C08G 18/7664* (2013.01); *C08L 75/04* (2013.01); *B29K 2075/00* (2013.01); *B29K 2105/12* (2013.01); *B29K 2309/06* (2013.01); *B29L 2031/10* (2013.01); *C04B 2111/40* (2013.01); *C08G 2101/0066* (2013.01); *C08G 2101/0083* (2013.01); *C08K 3/36* (2013.01); *Y10T 428/249986* (2015.04); *Y10T 442/10* (2015.04)

(56) References Cited

U.S. PATENT DOCUMENTS

| | | | | |
|---|---|---|---|---|
| 6,898,468 B2* | 5/2005 | Ott | ............ | G05B 9/02 700/21 |
| 6,915,235 B2* | 7/2005 | Reeves | ............ | G05B 19/4065 702/181 |
| 7,242,116 B2* | 7/2007 | Kawazu | ............ | G05B 19/058 307/326 |
| 8,260,487 B2* | 9/2012 | Plawecki | ............ | G05B 9/03 340/3.1 |
| 8,375,838 B2* | 2/2013 | Rudakevych | ............ | F41A 19/58 700/245 |
| 8,478,478 B2* | 7/2013 | Macri | ............ | G05B 19/0428 700/3 |
| 8,656,081 B2* | 2/2014 | Irizarry | ............ | A63F 13/02 710/241 |
| 9,086,688 B2* | 7/2015 | Law | ............ | G05B 9/02 |
| 2013/0018692 A1* | 1/2013 | Guo | ............ | G06F 11/008 705/7.25 |
| 2013/0218372 A1* | 8/2013 | Wolfanger | ............ | F41A 19/58 701/3 |

OTHER PUBLICATIONS

Askerdal et al. "A Control Theory Approach for Analyzing the Effects of Data Errors in Safety-Critical Control Systems", 2002 IEEE, 10 pages.*

Cullyer "Safety-critical control systems", 1991, pp. 202-210.*

* cited by examiner

SAFETY CRITICAL CONTROL SYSTEM THAT INCLUDES CONTROL LOGIC OR MACHINE READABLE INSTRUCTIONS THAT SELECTIVELY LOCKS OR ENABLES THE CONTROL SYSTEM BASED ON ONE OR MORE MACHINE IMPLEMENTED STATE MACHINES THAT INCLUDES STATES ASSOCIATED WITH DETECTION OR MATCHING OF ONE OR MORE PREDETERMINED SIGNALS ON DISTINCT CONDUCTION PATHS BETWEEN ELEMENTS OF THE CONTROL SYSTEM AND RELATED METHODS

CROSS-REFERENCE TO RELATED APPLICATIONS

The present application claims priority to U.S. Provisional Patent Application Ser. No. 61/805,551, filed Mar. 27, 2013, entitled "SAFETY CRITICAL CONTROL SYSTEM AND METHOD," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon.

BACKGROUND

The present invention relates to safety critical control systems. In particular, the invention relates to software and hardware systems and methods that implement a control system for systems that require high reliability and safety.

A life-critical system or safety-critical system is a system whose failure or malfunction may result in death or serious injury to people; loss or severe damage to equipment and/or environmental harm. A variety of approaches have been attempted to increase safety margins and reliability however these approaches have resulted in a variety of disadvantages which result in undesirable first, second, and third order effects.

For example, single signal systems result in a susceptibility to stray voltage activated control inputs and serial control systems result in increased overhead and complexity which can create different failure modes. Increased overhead requires more complex software and control systems such as advanced microprocessors that have to be ruggedized against a variety of environmental threats. Complex software requires substantial resources including time and personnel to write and maintain. Therefore, improvements to existing state of the art control systems are needed to enable use of safety critical control systems in environments where high reliability and simplified implementation are required.

SUMMARY OF THE DISCLOSURE

An exemplary embodiment of the invention can include a safety critical control transmitting and receiving apparatus comprising a transmitter that has a first state machine. The exemplary first state machine further contains a first plurality of identifiable states. The exemplary apparatus also has a receiver that that has a second state machine where the second state machine contains a second plurality of identifiable states. The exemplary apparatus also has a control bus containing a plurality of wires where the control bus electronically couples the first state machine and the second state machine. The exemplary first state machine transmits a specific state to the second state machine through the control bus.

An exemplary embodiment of the invention also can include a method of controlling a safety critical control device. One exemplary method involves sending user inputs to a first state machine, identifying user inputs by the first state machine, determining a correct state to communicate to a second state machine, the correct state being determined by selecting one state of a plurality of states depending on the user inputs, communicating the correct state to a second state machine through a control bus, and determining the correct state for the second state machine based on communication from the control bus.

An exemplary embodiment of the invention can also include an apparatus for controlling a safety critical device that has a control panel that has a plurality of inputs, an activation switch that can maintain an engaged or a disengaged position, a first state machine that is electronically coupled to the control panel and the activation button, a control bus that is electronically coupled to the first state machine, a second state machine that is electronically coupled to the control bus, and a safety critical device that has an engaged position and a disengaged position. In this exemplary apparatus, the safety critical device cannot be engaged without corresponding commands from both the plurality of inputs on the control panel and the activation switch.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

Further objects and advantages of the present invention will become readily apparent upon reference to the following description of the preferred embodiments and to the accompanying drawings, wherein corresponding reference characters indicate corresponding parts in the drawings and wherein.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1A:
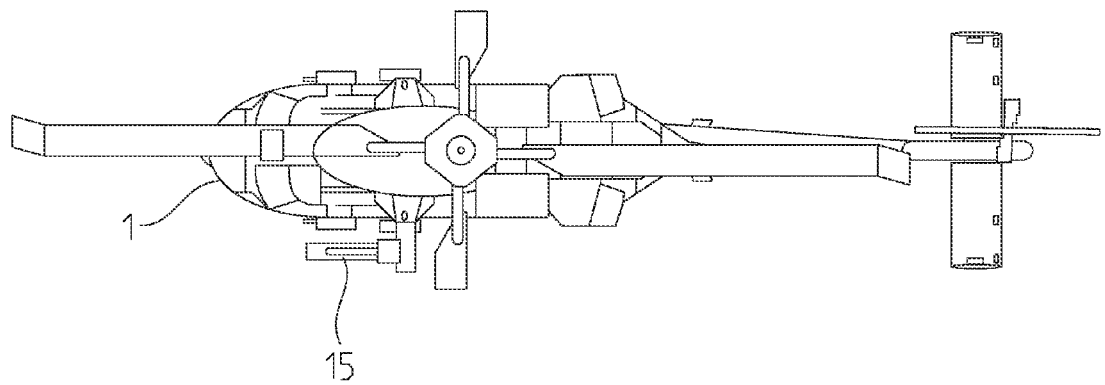
FIG. 1 depicts a safety critical control system in one embodiment of the invention.
Figure 1B:
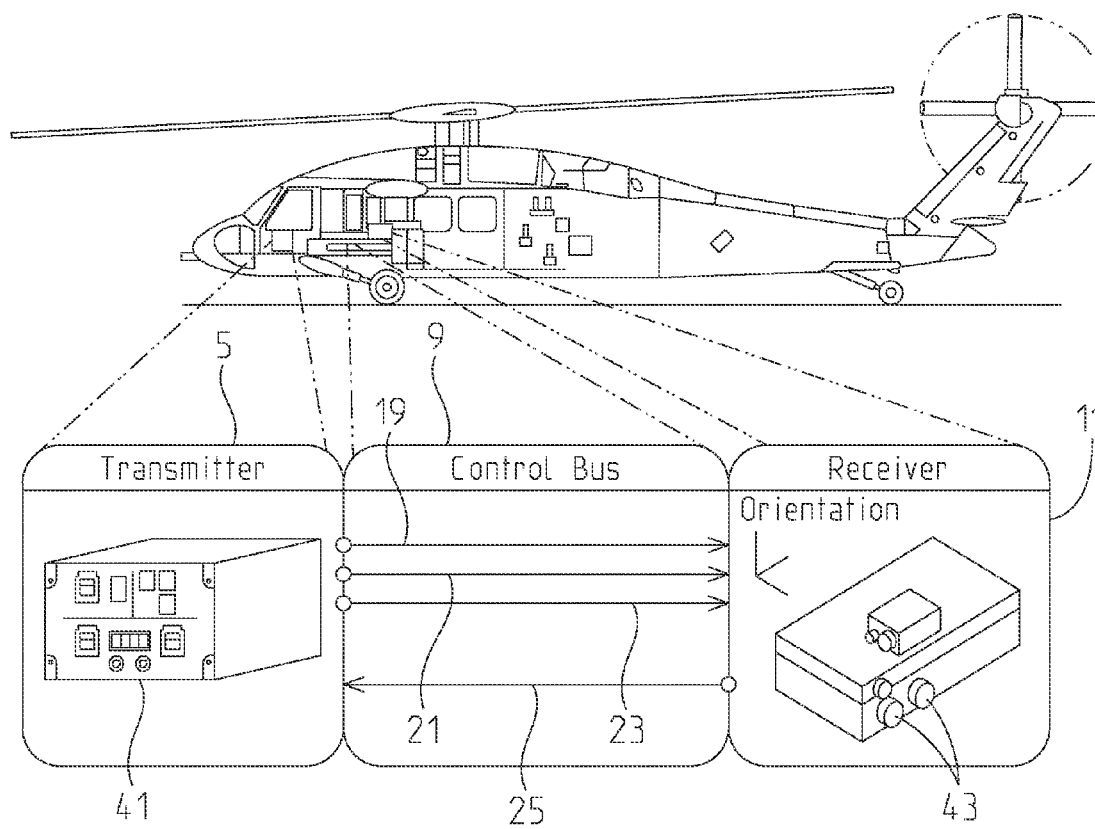

Referring now to FIG. 1, a safety critical control system 1 in accordance with one embodiment of the invention includes a transmitter 5, a control bus 9, and a receiver 11. The transmitter 5 is adapted to receive system control inputs from a user or other control systems (not pictured). The exemplary control bus 9 includes redundant bus lines or wires coupling the transmitter 5 with the receiver 11; the receiver 11 interfaces with a system under control 15. The exemplary control bus 9 comprises wires or lines that are shielded and separated from each other. In this embodiment, the redundant control lines or wires comprise three lines or wires 19, 21, 23 in at least one redundant portion of the system where two out of the three control wires (e.g., 19, 21) carry an inverted logic signal as compared to the signal carried on the third line or wire, e.g., 23. An additional fourth wire or control line can be utilized to communicate fault conditions detected by the receiver to the transmitter, 25.

In particular, the exemplary control bus 9 wiring or control lines comprise a primary 19, secondary 21, and tertiary line 23 which are each adapted to carry a plurality of signals generated by the transmitter 5, one of which indicates a valid activation or control signal. The three wires or control lines 19, 21, 23, 25 comprising the exemplary control bus 9 can be routed in their own wire bundle which can be further protected by a grounded shield 27 (not shown). The wires or control lines 19, 21, 23, 25 can be separated and shielded to reduce risks associated with damage to the bus 9 lines or wires as well as to reduce susceptibility to radiated emissions. The receiver 11 can have a signal processing system having a section adapted to function as a receiving state machine 43 for detecting signal combinations from one or more lines (e.g., 19, 21, 23) in the exemplary control bus 9. One embodiment has a receiver 11 and receiving state machine 43 further adapted to further detect and process signals from at least one system under control 15.

Figure 2:
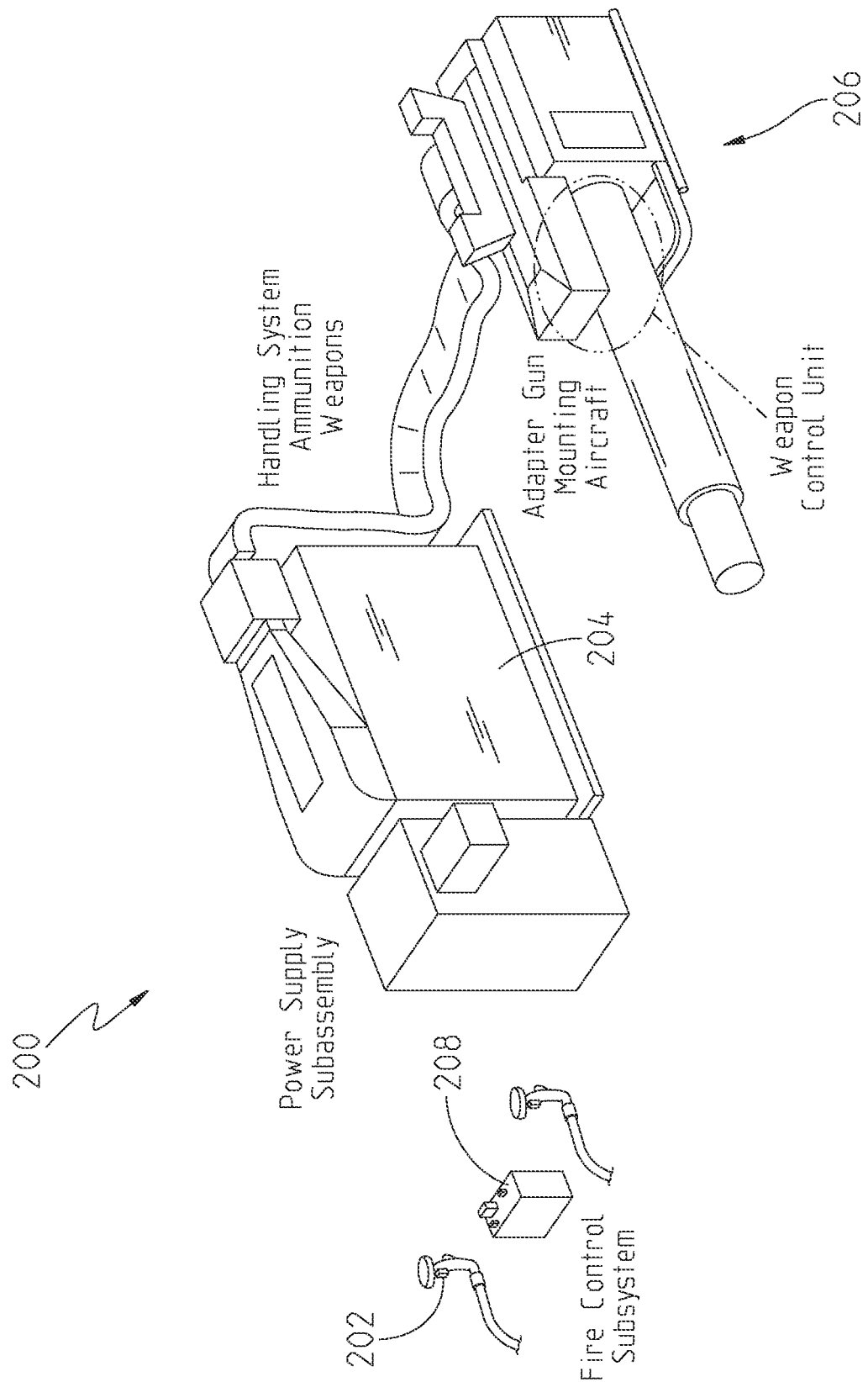
FIG. 2 shows another embodiment of a safety critical control system.

FIG. 2 illustrates how one station 200 can be controlled and powered by the safety critical control system 1. In this embodiment, a power supply subassembly 204 can provide the necessary power to the station 200. Station 200 can include an activation mechanism 202 that is electronically coupled to transmitting state machine 41. Further, a control panel 208 can be located in a position that is accessible to a user and can contain a plurality of buttons or controls. Control panel 208 can also be electronically coupled to transmitting state machine 41. Transmitting state machine 41 can transmit a signal along the bus 9 that is generated by inputs received from both the control panel 208 and the activation mechanism 202. The bus 9 may further relay the signal to a receiving state machine 43. The receiving state machine 43 can interpret the signal sent by the transmitting state machine 41 through the bus 9 to control a safety critical device 206. The safety critical device 206 may not be activated unless the proper state indicator has been received from the transmitting state machine 43.

Figure 3:
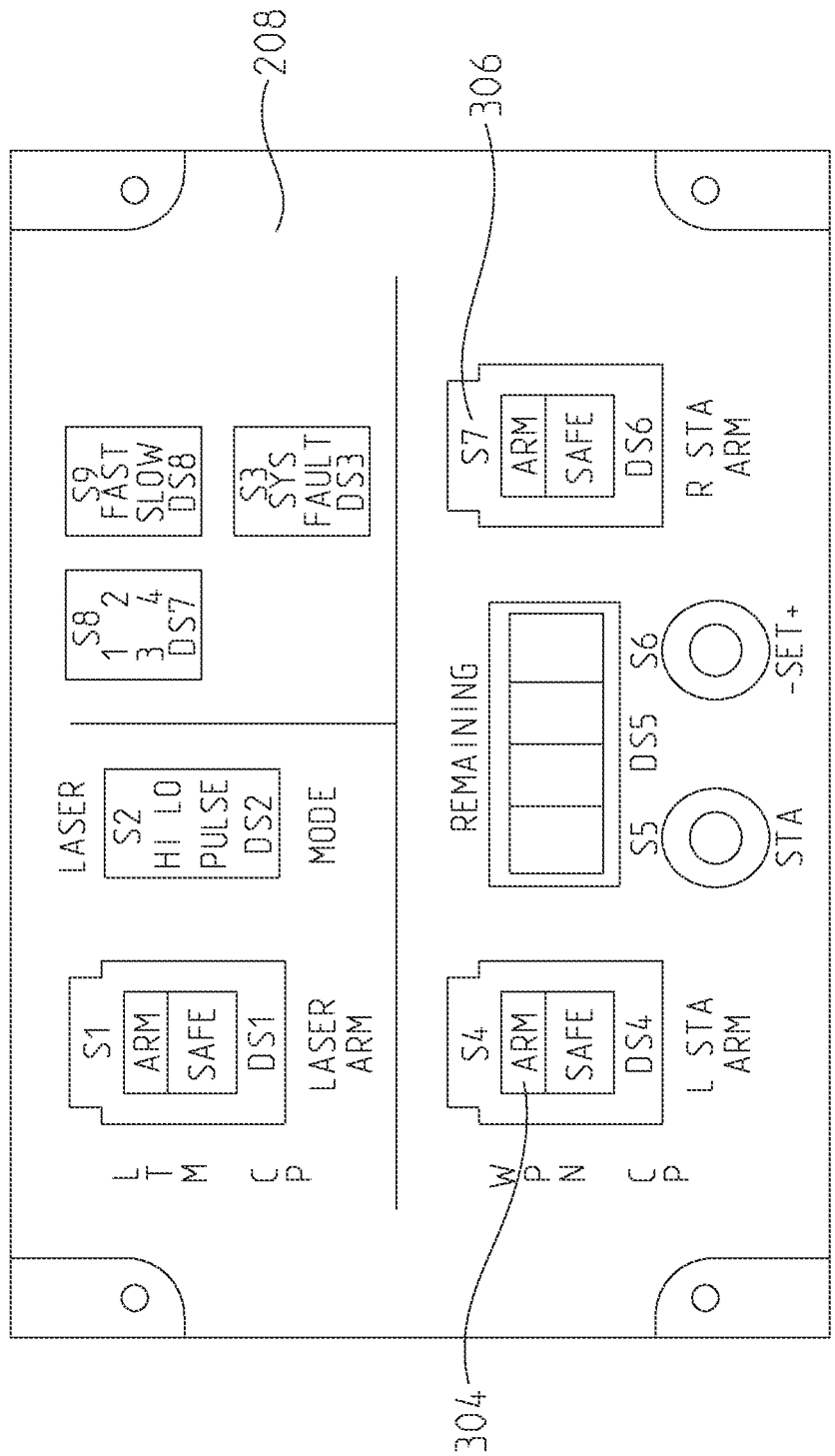
FIG. 3 shows one embodiment of a control panel of the safety critical control system of FIG. 1

FIG. 3 illustrates a control panel 208 that can control a plurality of helicopter external weapon or stores mounting stations (not shown). For example, the control panel 208 can provide for user inputs to arm or disarm a selected weapon or stores mounting, e.g., station four 304, or station seven 306. The control panel 208 can be electronically coupled to both the activation mechanism 202 and the transmitting state machine 41 to communicate the user inputs to the transmitting state machine 41. For example, when one of the stations 304 or 306 has been switched by the user into an armed state, the transmitting state machine 41 may be in a ready to operate state. Further, if the transmitting state machine 41 is in a ready to operate state and the activation mechanism 202 is engaged by the user, the transmitting state machine 41 may enter into an operate state for a duration of a time the activation mechanism 202 is engaged.

Figure 4:
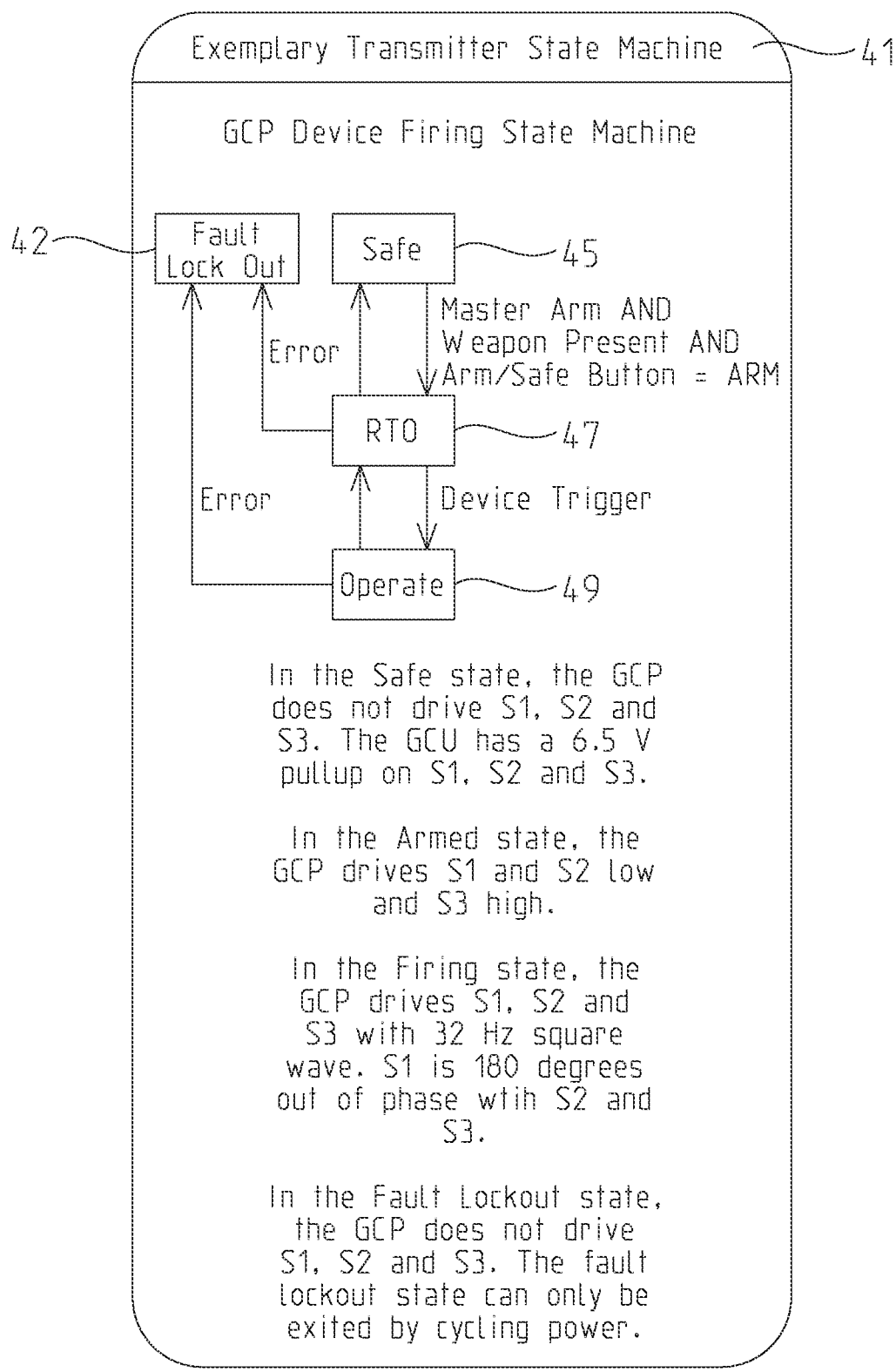
FIG. 4 shows one embodiment of a transmitter state machine of the safety critical control system of FIG. 1.
Figure 6:
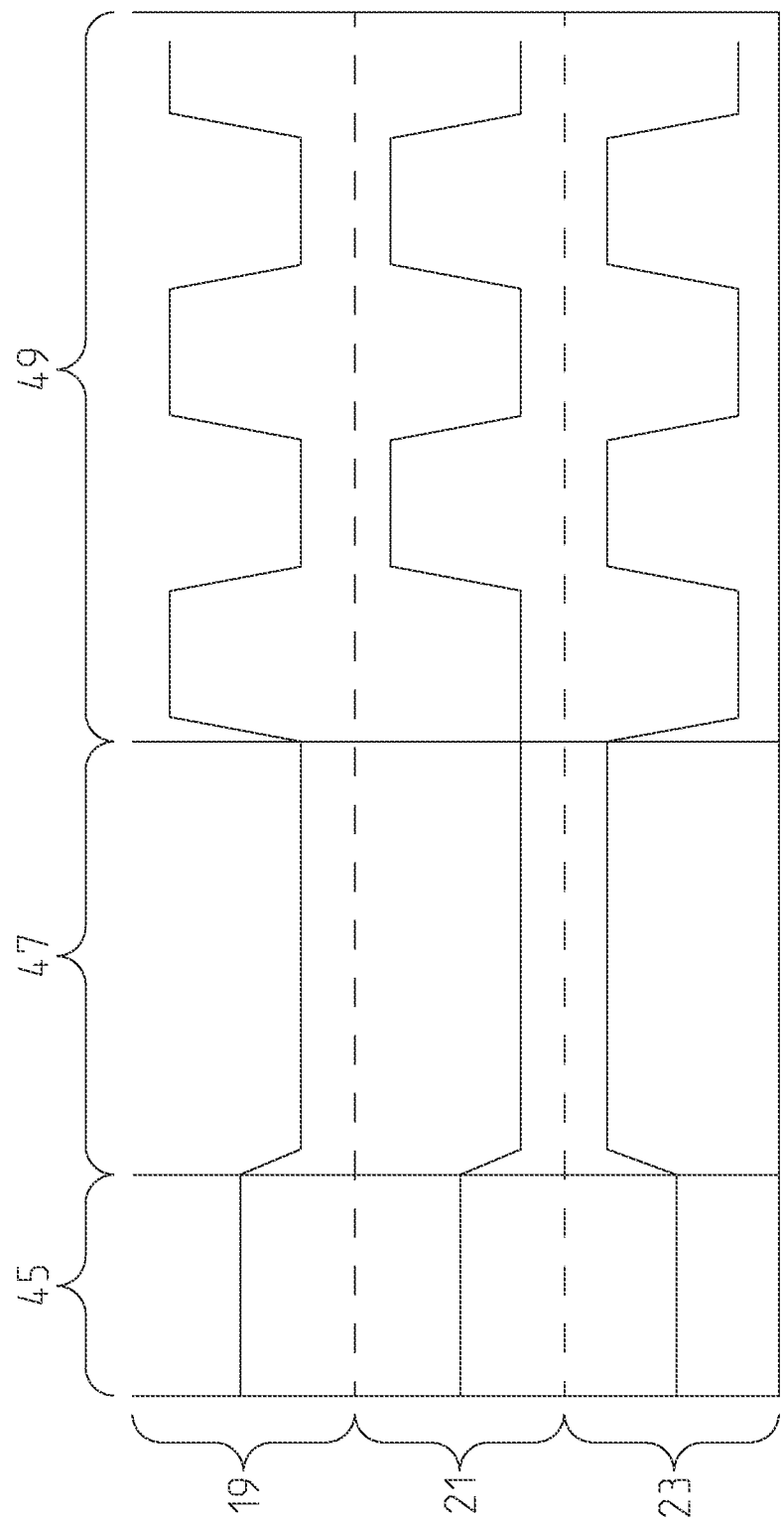
FIG. 6 shows an embodiment of a control system signal timing configuration of the safety critical control system of FIG. 1.

Referring to FIG. 4, the exemplary transmitting state machine 41 referenced in FIG. 1 is shown having a plurality of states including a power-up/safe state 45, a fault and/or lock-out state 42, a ready-to-operate (RTO) state 47, and an operate state 49. These states are duplicated in both the transmitter 5 and receiver 11 referenced in FIG. 1. The exemplary transmitting and receiving state machines 41, 43 are adapted to have transitions from one state to another that require one or more conditions to be satisfied. The exemplary transmitter power-up/safe state 45 of the transmitter 5 occurs when power is applied to the transmitter 5. The exemplary transmitter 5 transitions between the power-up/safe state 45 and the RTO state 47 when inputs to the transmitter 5 (either from other control systems or from the user) equal a predetermined state, e.g., when one of the stations 304 or 306 of the control panel 208 is switched to an armed position. While in the RTO state 47, the transmitter 5 changes the state of the control bus 9 as shown in FIG. 6 with the primary line 19 being driven logic low, the secondary line 21 being driven logic low and the tertiary line 23 being driven logic high. The exemplary transmitter 5 transitions between the RTO state 47 and operate state 49 when inputs to the transmitter 5 (either from other control systems or from the user engaging the activation mechanism 202) equal a predetermined state. While in the operate state 49, the transmitter 5 changes the state of the control bus 9 as shown in FIG. 6 with the primary line 19 being driven logic high, the secondary line 21 being driven logic low and the tertiary line 23 being driven logic low. Additionally, these states must transition to their opposite logic state periodically to remain in the operate state 49. During the operate state 49, the primary line 19 may be delivering a first discrete signal while the secondary 21 and tertiary 23 lines may be delivering a parallel discrete signal to one another, but an inverted discrete signal compared to the primary line 19. For the transmitter 41 to remain in the operate state 49, the discrete and inverted discrete signals can properly transitioning from logic high to logic low state while being monitored by time restraints. For example, if the primary line 19 transitions from the logic high state to the logic low state, the secondary 21 and tertiary 23 lines may have to transition to a logic low state within 10 milliseconds of the transition of the primary line 19 in order to continue operating the safety critical device. The exemplary transmitter 5 cannot transition directly from the power-up/safe state 45 to operate state 49.

The exemplary transmitter 5 enters the fault and/or lock-out state 42 when an internal error to the transmitter 5 is detected, other input conditions to the transmitter 5 (either from other control systems or from the user) equal a predetermined state, or the receiver 11 transmits a fault condition to the transmitter 5 via the fault control line 25 on the control bus 9. The fault/and or lock-out state 42 prevents the transmitter 5 from transitioning to any other state until power is cycled to the transmitter 5. The exemplary transmitter power-up/safe state 45 of the receiver 11 occurs when power is applied to the receiver 11.

Figure 5:
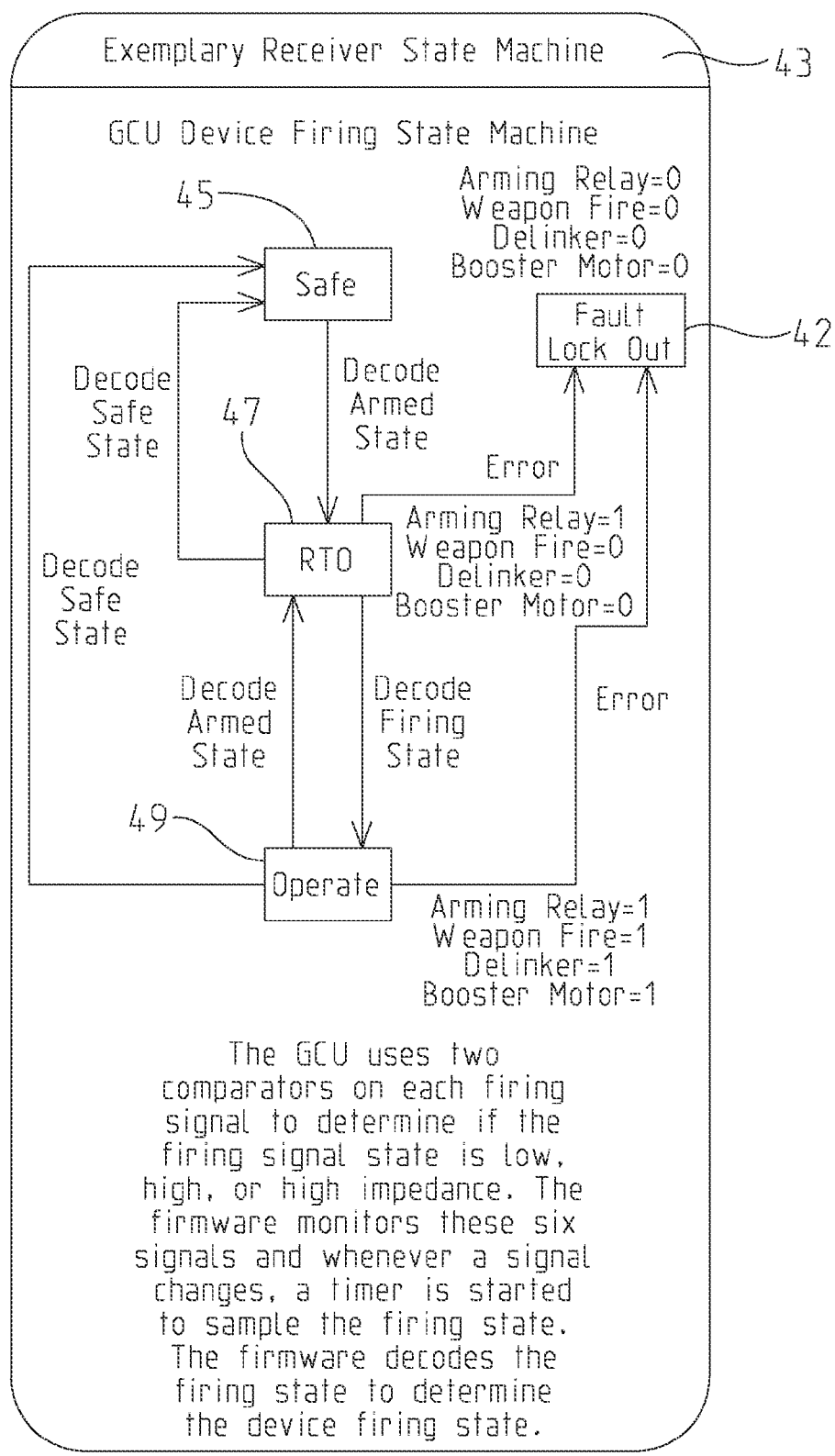
FIG. 5 shows an embodiment of a receiver state machine of the safety critical control system of FIG. 1.

FIG. 5 illustrates how the exemplary receiver 11 transitions from the power-up/safe state 45 to the RTO state 47 when the control bus 9 transitions to the states shown in FIG.

6 with the primary line 19 being driven logic low, the secondary line 21 being driven logic low and the tertiary line 23 being driven logic high.

The exemplary receiver 11 transitions from the RTO state 47 to the operate state 49 when the control bus 9 transitions to the states shown in FIG. 6 with the primary line 19 being driven logic high, the secondary line 21 being driven logic low and the tertiary line 23 being driven logic low. Additionally, during the operate state 19, the primary, secondary, and tertiary lines 19, 21, and 23 can send discrete and inverted discrete signals to the receiver 11. The primary, secondary and tertiary lines 19, 21, and 23 must transition to their opposite logic state periodically within a time constraint to remain in the operate state 49. While in operate state 49, the receiver 11 will permit the system under control 15 to be operated. The exemplary receiver 11 cannot transition directly from the power-up/safe state 43 to the operate state 49.

The exemplary receiver 11 enters the fault and/or lock-out state 42 when an internal error is detected, other input conditions to the receiver 11 equal an unrecognized state, or the control bus 9 does not transition as specified in FIG. 6. The receiver 11 transmits a fault condition to the transmitter 5 via the fault control line 25 on the control bus 9 while in the fault and/or lock-out state 42. The fault/and or lock-out state 42 prevents the receiver 11 from transitioning to any other state until power is cycled to the receiver 11.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited 'to any single embodiment, but rather construed in breadth and scope in accordance with the recitation of the appended claims.

The invention claimed is:

1. A control and configuration system for a safety critical device comprising:
    a control panel configured to receive user inputs used to configure or control a device, said control panel comprising a plurality of user operated controls, one or more equipment operational status displays;
    a transmitter communicatively coupled with the control panel, the transmitter comprising a first logic unit including a first plurality of logic elements configured to selectively implement a first state machine, the first state machine comprising a first plurality of identifiable states, wherein said first plurality of identifiable states comprises a first power-up safe state, a first ready-to-operate state, and a first operate state;
    a receiver system comprising a second logic unit including a second plurality of logic elements configured to selectively implement a second state machine, the second state machine comprising a second plurality of identifiable states, wherein said second plurality of identifiable states comprises a second power-up safe state, a lock-out state, a second ready-to-operate state, and a second operate state, wherein said receiver system is communicatively coupled with said device; and
    a control bus containing a plurality of wires, the control bus electrically coupling the transmitter and the receiver;
    wherein, the transmitter is configured to transmit to the receiver, via the control bus one set of a plurality of discrete signal sets that are each respectively associated with each of said first plurality of identifiable states that the first state machine has selected or instantiated from said plurality of first identifiable states based on input from said user operated controls;
    wherein said plurality of discrete signal sets respectively comprises a first, second, and third discrete signal sets, wherein said first discrete signal set comprises a first signal pattern associated with said first power-up safe state, said second discrete signal set comprises a second signal pattern associated with said first ready to operate state, and said third discrete signal set is associated with said operate state, wherein said first plurality of logic elements are configured to generate said first and second discrete signal sets as constant logic signals, said first plurality of logic elements are configured to generate said third discrete signal set as a time varying logic signal;
    wherein said receiver is communicatively coupled with the device to configure and operate said device based on inputs received from said transmitter comprising said plurality of discrete signal sets;
    wherein said second logic unit is configured to select one of said second plurality of identifiable states based on said first, second or third discrete signal sets;
    wherein said receiver comprises a receiver clock, said receiver clock selectively configures or operates said device based on said second plurality of identifiable states, wherein said receiver monitors said inputs received from said transmitter and starts said receiver clock upon transition between said ready-to-operate state and said operate state in order to measure said time varying logic signal associated with said third discrete signal set;
    wherein said lock-out state is selected by said second logic unit based on an internal error detected by the receiver, input conditions to the receiver equal an unrecognized state not matching one of said second identifiable states, or said discrete signal sets received by the transmitter via the control bus that do not transition between said second power-up safe state, said second ready to operate state, and said second operate state based on transition criteria stored or accessed by said receiver.

2. The system of claim 1 wherein the first state machine configures said transmitter to invert each logic value in said second discrete signal sets to generate said third discrete signal sets through the control bus.

3. The system of claim 1 wherein the transmitter is configured to operate said first state machine by transmitting said first, second, and third discrete signal sets with predetermined values through the control bus to the receiver to operate the second state machine in order to transition between states of the second state machine.

4. The system of claim 1 wherein the transmitter is configured to operate the first state machine by transmitting said first, second, and third discrete signal sets through the control bus which must be received by the receiver within a specified timeframe stored in said receiver in order to transition between the second plurality of identifiable states of the second state machine.

5. The system of claim 1, said transmitter is further configured to transmit a feedback control signal to the control panel through the transmitter to enable the receiver via the control panel to indicate a fault condition using one of said equipment operational status displays.

6. The system of claim 1 configured to control a weapon system.

7. The system of claim 1, wherein said device comprises a laser.

8. A method of controlling a control and configuration system for a safety critical device, the method comprising:

operating a user control panel operable for controlling and configuring a safety critical device and sending one or more user inputs from the user control panel to a transmitter comprising a first plurality of logic elements that selectively implements a first state machine, the first state machine comprising a first plurality of identifiable states, wherein said first plurality of identifiable states comprises a first power-up safe state, a first ready-to-operate state, and a first operate state, wherein each of said first plurality of identifiable states are associated with one of a first plurality of discrete signal sets;

identifying and correlating said user inputs using the first state machine with one of said first plurality of identifiable states to determine a current first identifiable state correlated with said user inputs;

communicating one of said first plurality of discrete signals set associated with the current first identifiable state to a receiver comprising a second plurality of logic elements configured to selectively implement a second state machine, the second state machine comprising a second plurality of identifiable states each associated with a second plurality of discrete signal sets, wherein said second plurality of identifiable states comprises a second power-up safe state, a lock-out state, a second ready-to-operate state, and a second operate state, wherein said receiver system is communicatively coupled with said safety critical device; and determining and correlating said first discrete signals set with one of said second plurality of second discrete signal sets associated to determine a second current state;

wherein said receiver comprises a receiver clock, said receiver clock selectively configures or operates said safety critical device based on said current state, wherein said receiver monitors inputs received from said transmitter and starts said receiver clock upon transition between said ready-to-operate state and said operate state in order to measure a time varying logic signal associated with a time varying discrete signal state associated with said operate state;

wherein said lock-out state is selected by said second plurality of logic elements based on an internal error detected by the receiver, input conditions to the receiver equal an unrecognized state not matching one of said second identifiable states, or said discrete signal sets received by the transmitter that do not transition between said second power-up safe state, said second ready to operate state, and said second operate state based on transition criteria stored or accessed by said receiver.

9. The method of claim 8, wherein the transmitter communicates to the receiver by sending a selected one of said plurality of discrete signals sets through a control bus.

10. The method of claim 8 wherein the receiver comprising said second state machine communicates a message signal with said user control panel that said receiver has locked-out the safety critical device if said unrecognized state comprising an unrecognized discrete signal set is received by the receiver comprising the second state machine.

11. The method of claim 8 wherein the transmitter comprising the first state machine communicates one of said plurality of discrete signal sets and an inverse of the one of said plurality of discrete signal sets to the receiver comprising the second state machine to perform an operating function associated with said safety critical device.

12. The method of claim 8 wherein the receiver comprising said second state machine operates said safety critical device based on matching at least one of said plurality of discrete signal sets with at least one of said plurality of said discrete signal sets based on said second plurality of identifiable states.

* * * * *